No. 756,647. PATENTED APR. 5, 1904.
W. E. JONES.
EIGHT WHEELED WAGON.
APPLICATION FILED JAN. 4, 1904.
NO MODEL. 2 SHEETS—SHEET 2.
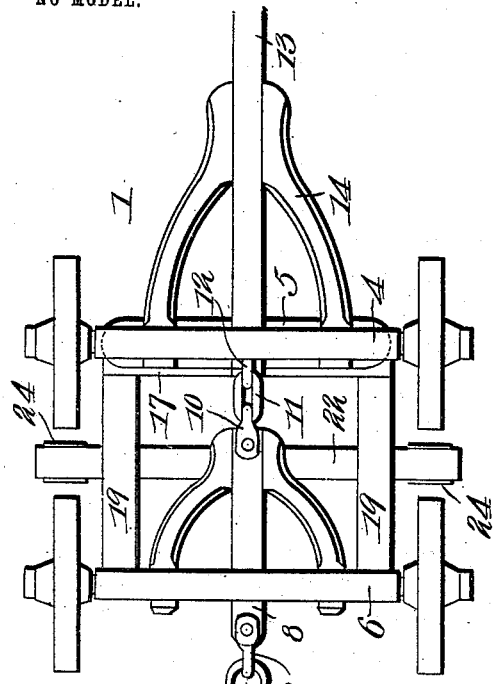
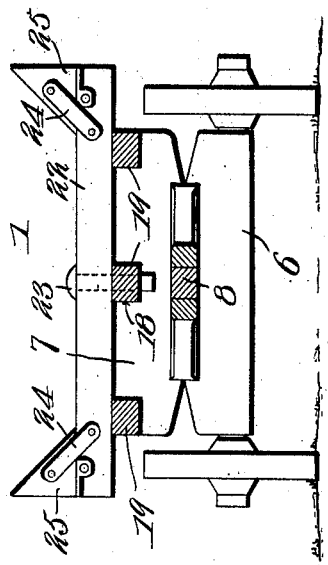
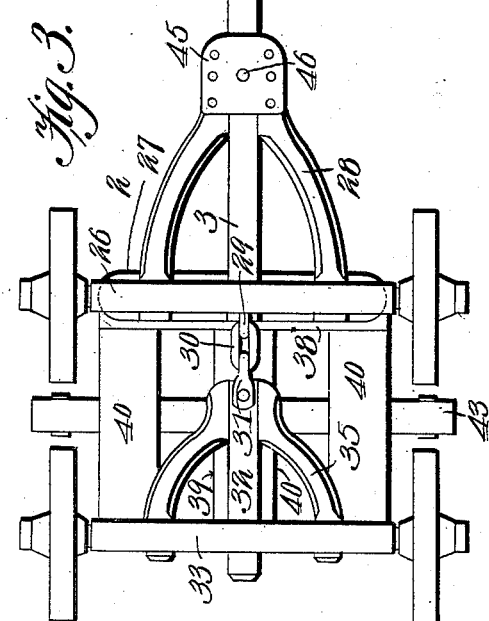
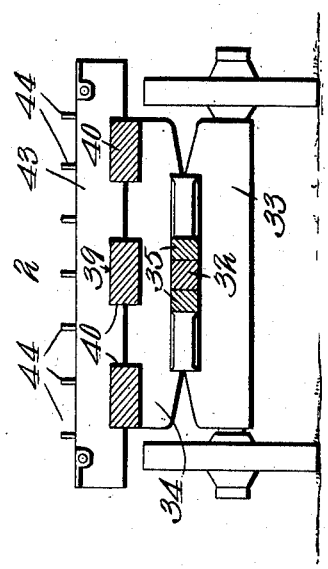
Witnesses
E. F. Stewart
F. S. Elmore
William E. Jones, Inventor.
by C. A. Snow & Co.
Attorneys No. 756,647. Patented April 5, 1904.

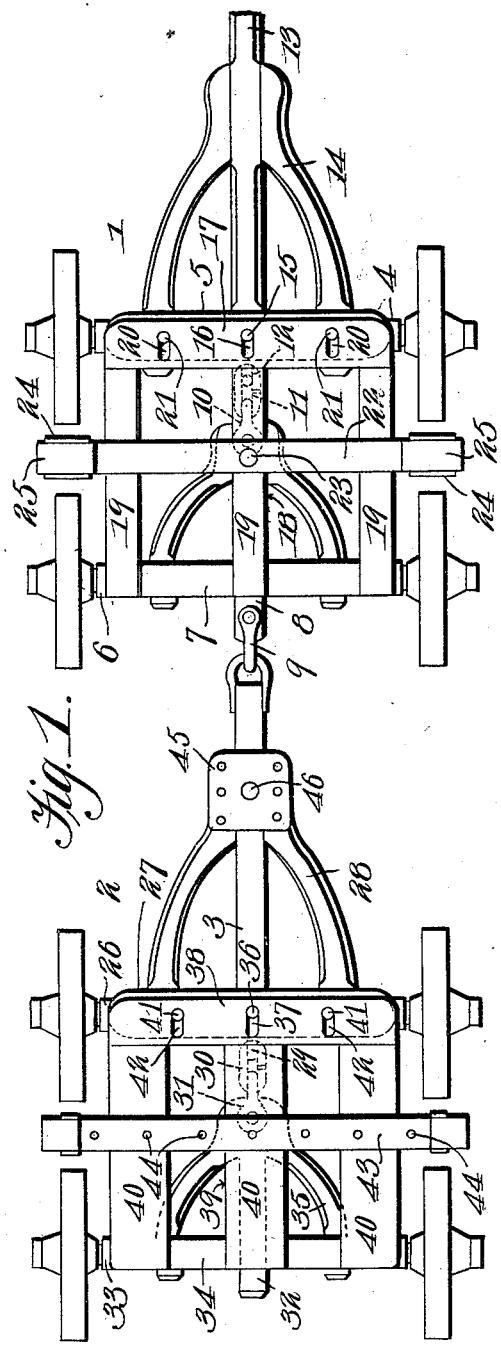

UNITED STATES PATENT OFFICE.

WILLIAM E. JONES, OF ELLISVILLE, MISSISSIPPI.

EIGHT-WHEELED WAGON.

SPECIFICATION forming part of Letters Patent No. 756,647, dated April 5, 1904.

Application filed January 4, 1904. Serial No. 187,690. (No model.)

*To all whom it may concern:*

Be it known that I, WILLIAM E. JONES, a citizen of the United States, residing at Ellisville, in the county of Jones and State of Mississippi, have invented a new and useful Eight-Wheel Wagon, of which the following is a specification.

My invention relates to wagons such as are employed for hauling logs, railroad-ties, and other heavy loads, and has for its object to produce a comparatively simple device of this character which in practice will be strong and durable, one in which the weight of the load will be equally distributed between the axles, and one in which the latter will have independent vertical play for overriding surface obstructions.

With these and other objects in view the invention comprises the novel features of construction and combination of parts more fully hereinafter described.

In the accompanying drawings, Figure 1 is a top plan view of a wagon embodying my invention. Fig. 2 is a side sectional elevation of the same. Fig. 3 is a reversed plan view. Figs. 4 and 5 are transverse sections taken, respectively, on the lines 4 4 and 5 5 of Fig. 2.

Referring to the drawings, it will be seen that my improved wagon comprises a primary forward truck 1 and a secondary rear truck 2, connected or coupled by a main reach-beam 3. The primary truck includes a front axle 4, over which there is disposed an auxiliary bolster 5, and a rear axle 6, having an overlying auxiliary bolster 7, these axles being connected or coupled by an auxiliary reach-beam 8. The rear end of the reach-beam 8 is disposed between the axles 6 and overlying bolster 7 and projects slightly rearward of the latter and has pivoted to its rear terminal a coupling member or clevis 9, pivotally engaged by a similar clevis 9' on the forward end of the main reach 3. The forward end of the reach 8 is provided with a clevis 10, engaged by a link 11, which in turn engages a clevis 12, attached to the rear end of a tongue or pole 13 for pivotally connecting said parts. The tongue is mounted at its rear end between axle 4 and overlying bolster 5 and braced by hounds 14, which are also seated at their rear ends between the axle and bolster.

Projecting vertically upward from the bolster 5 is a king-bolt 15, designed to engage a slot 16, formed in the front transverse bar 17 of a bolster-frame 18, the longitudinal bars 19 of which are seated and secured at their rear ends in suitable sockets provided in the upper face of bolster 7. The transverse bar 17 is also provided with a pair of side slots 20, disposed upon opposite sides of the central slot 16 and adapted for the reception of auxiliary bolts 21, which in practice are removably engaged at their ends with the bolster 5, these bolts, together with the king-bolt, being designed in practice to sustain the strain incident to backing the vehicle and to prevent swinging of the axle 4 in a horizontal plane, this latter movement being, however, permitted by removal of the bolts 21.

The frame 18 supports a main load-receiving bolster 22, centrally pivoted by a king-bolt 23 to the central longitudinal bar 19 of the frame, said bolster 22 having attached to its ends by links 24 suitable sustaining blocks or members 25, which engage at opposite sides of the latter and are adapted for the attachment of the usual standards.

The secondary truck 2 is practically identical in construction with that just described and consists of a front axle 26, having an overlying auxiliary bolster 27, between which and the axle there is seated the rear end of the main reach-beam 3 and the rear ends of main hounds 28, which are engaged with and strengthen the reach, as usual. The rear end of the reach has attached thereto a clevis or coupling member 29, engaged by a link 30, which in turn engages a clevis 31, attached to the forward end of an auxiliary reach 32, seated at its rear end between the rear axle 33 and an overlying auxiliary bolster 34, which also receives between them the rear ends of auxiliary hounds 35, engaged with the reach 32. The bolster 27 carries a vertical uprising king-bolt 36, engaging a slot 37 in the front beam 38 of a bolster-frame 39, sustained above the rear truck, the longitudinal beams of said frame being seated and secured in sockets provided in the bolster 34. The frame 39 is further engaged at its forward end with the bolster 27 by means of removable auxiliary bolts 41, extending through slots 42 and detachably engaging the underlying bolster, these bolts subserving the same function as that heretofore described in connection with bolts 21.

Sustained by frame 39 is a main load-receiving bolster 43, rigidly secured at the center of the frame and having in its under face suitable sockets for the reception of the longitudinal beams 40, there being provided upon the upper face of the bolster spacing members or pins 44, which receive the logs or other articles between them.

At the point of juncture of main reach-beam 3 and hounds 28 there is disposed upper and lower strengthening-plates 45, bolted or otherwise secured to the ends of the hounds and receiving a removable bolt 46, designed to extend through the main reach 3, which latter may thus be removed and replaced by a reach of greater length in order to vary the distance between the trucks according to the length of the articles composing the load.

From the foregoing it is apparent that the wagon as a whole will, owing to the link-and-clevis connections between the main and auxiliary reaches, be exceedingly flexible and that the axles will have independent vertical movement in overriding obstructions and that, furthermore, aside from the trucks being exceedingly strong and durable the load will, owing to the central disposition of the main bolsters 22 43 relative to the adjacent truck-axles, be equally distributed upon the latter. In attaining these ends it is to be understood that I do not limit myself to the precise details herein set forth, as minor changes may be made without departing from the spirit of the invention.

Having thus described my invention, what I claim is—

In a device of the class described, the combination with a primary and a secondary truck, each comprising front and rear axles, of main reach extending between and coupling said trucks, auxiliary reaches extending between and coupling the axles of the respective trucks, coupling connections between the main and auxiliary reaches, auxiliary bolsters overlying the axles of the respective trucks, bolster-frames sustained by said bolsters, a fixed king-bolt and auxiliary removable bolts carried by the front bolster of each truck and engaging slots provided in the overlying bolster-frame, and main bolsters sustained, respectively, by said frames.

In testimony that I claim the foregoing as my own I have hereto affixed my signature in the presence of two witnesses.

WILLIAM E. JONES.

Witnesses:
W. V. WALTERS,
J. A. TIMM.